R. HARVEY AND A. HOLMES.
FURNACE FOR LOCALLY HEATING METALS.
APPLICATION FILED NOV. 3, 1920.
1,407,412. Patented Feb. 21, 1922.
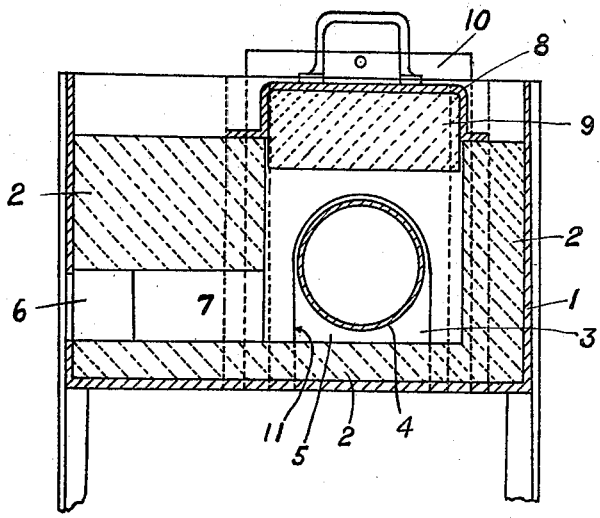
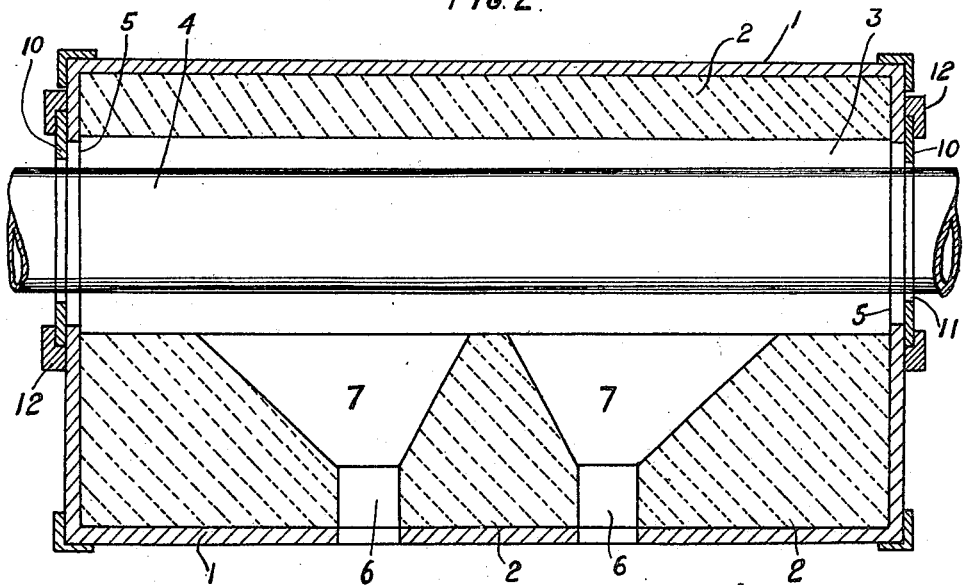
Inventors
Ralph Harvey
and Alexander Holmes

UNITED STATES PATENT OFFICE.

RALPH HARVEY AND ALEXANDER HOLMES, OF GLASGOW, SCOTLAND, ASSIGNORS TO HARLAND AND WOLFF, LIMITED, OF GLASGOW, SCOTLAND.

FURNACE FOR LOCALLY HEATING METALS.

1,407,412.   Specification of Letters Patent.   Patented Feb. 21, 1922.

Application filed November 3, 1920. Serial No. 421,559.

*To all whom it may concern:*

Be it known that we, RALPH HARVEY, a subject of the King of the United Kingdom of Great Britain and Ireland, and resident of 242 Wilton Street, Glasgow, Scotland, and ALEXANDER HOLMES, a subject of the King of the United Kingdom of Great Britain and Ireland, and resident of 9 Langlands Road, Govan, Glasgow, aforesaid, have invented new and useful Improvements in Furnaces for Locally Heating Metals, of which the following is a specification.

This invention relates to liquid or gaseous fuel furnaces for locally heating metal tubes or bars for the purpose of bending the metal to any desired shape and has for its object to enable the heating operation to be carried out more expeditiously, efficiently and economically than on coke-fired furnaces.

It has heretofore been proposed in gaseous fuel furnaces for heating round iron to provide a number of separate heating chambers indirectly connected with the gas nozzles through gas passages and to provide a horizontal channel running the length of the furnace through the heating chambers and their partitions, the round iron being received in said channel. Tube brazing or soldering hearths have also been proposed comprising a removable cover for obtaining access to the fire for fuel feeding or the like, the cover having a refractory lining and a hinged end door and openings in the ends of the cover through which the tube may be passed through the fire.

In order that the invention may be more clearly understood reference is hereinafter made to the accompanying drawings showing the preferred construction of furnace for locally heating straight metal pipes but it will be understood that the improved furnace may also be readily constructed for use in locally heating bent or curved pipes by correspondingly shaping the furnace chamber.

On the drawings:—

Fig. 1 is a vertical transverse section through the furnace and Fig. 2 is a horizontal section therethrough.

As illustrated the furnace comprises an outer metal casing 1 of suitable length and breadth lined along the bottom and two sides thereof with fire-brick or other refractory material 2 so as to leave a channel or furnace chamber 3 throughout its length, said furnace chamber or channel 3 being open above and at its ends. The tube or bar 4 to be heated may be laid within the channel 3 and extend through openings 5 in the ends of the outer metal casing 1 and may be moved along the channel 3 as required to bring the portion of the tube or bar to be heated into position within the channel 3. The refractory lining 2 is provided with one or more burner orifices 6, preferably at one side of the furnace as illustrated, but if desired, the burner orifices may be provided in any other suitable position.

The burner orifices 6 are preferably enlarged towards the interior of the furnace at 7 as illustrated in Fig. 2 and are adapted to receive liquid or gaseous fuel burners of any suitable type, the enlarged interior 7 of the burner orifices enabling the burning fuel to be distributed over a greater area of the metal pipe 4. The fuel may be supplied to the burners from gravity tanks or in any other convenient manner.

The furnace is provided with a cover 8 over the channel 3, said cover being preferably lined with refractory material 9 adapted to fit into the upper part of the channel 3 as illustrated in Fig. 1. The cover 8 may be suitably counter-weighted so as to facilitate its removal and replacement and thus enable the metal pipe 4 to be readily inserted or removed.

The ends of the channel 2 are fitted with doors 10 or their equivalent slotted at 11 or otherwise constructed to embrace the metal pipe 4, said doors being preferably slidably fitted in suitable vertical guides 12. The slot or recess 11 in the sliding door 10 is preferably of such a size as to provide a small clearance around the surface of the pipe of about ¼ inch as clearly seen in Fig. 1 in order to provide for the escape of the gases, doors having slots 11 of different sizes being used according to the size of the metal tube or bar to be heated. If desired, however, the upper part of the channel 2 may communicate with suitable outlet flues in the refractory lining 2 or the cover 8 may be provided with flues or chimneys, preferably telescopic to enable the cover 8 to be raised or lowered and said flues or chimneys may be provided with dampers for regulating the outlet area.

In the case of long furnaces, a plurality of transverse sliding doors 10 or their equivalent may be provided in addition to those at the ends of the channel 3 so that any part of the furnace may be isolated from the remainder to enable local heating of long tubes or bars at one or more different points.

It will of course be understood that a plurality of furnaces may be arranged side by side within a common outer shell or casing.

Claims.

1. A furnace for locally heating metal tubes or bars comprising a refractory chamber open above and at its ends and of uniform width throughout, one of the side walls of said chamber being imperforate and the other provided with burner orifices, a refractory removable cover adapted to fit into the upper part of said chamber and having projecting flanges resting on said chamber for retaining said cover in position and slotted slidably guided doors disposed transversely of the chamber for embracing the article to be heated.

2. A furnace as specified in claim 1 in which the slots in the doors are such as to provide a small clearance around the article for the escape of the gases.

RALPH HARVEY.
ALEXANDER HOLMES.